Nov. 9, 1971  S. ELLIN  3,618,492
FLASH PHOTOGRAPHIC SYSTEM
Filed Oct. 30, 1969  4 Sheets-Sheet 4

INVENTOR.
SEYMOUR ELLIN
BY Brown and Mikulka
and
Gerald L. Smith
ATTORNEYS

United States Patent Office 3,618,492
Patented Nov. 9, 1971

3,618,492
FLASH PHOTOGRAPHIC SYSTEM
Seymour Ellin, Chestnut Hill, Mass., assignor to
Polaroid Corporation, Cambridge, Mass.
Filed Oct. 30, 1969, Ser. No. 872,644
Int. Cl. G03b 15/00; H04g 1/24
U.S. Cl. 95—11.5
32 Claims

ABSTRACT OF THE DISCLOSURE

A photographic flash exposure system operative to sequentially ignite individual flashlamps within an array of flashlamps. The system automatically passes a monitoring current through each of the flashlamps during each exposure cycle to derive alignment signals. These alignment signals function to align a flashlamp sequencing circuit to bypass inoperative flashlamps.

---

This invention relates to electronic flashlamp selection circuits for sequentially igniting individual flashlamps in an array of flashlamps, and more particularly, to improved sequence flashing circuits which function to test the individual flashlamps within an array and bypass those found to be inoperative.

BACKGROUND

Photographic flash systems in which a plurality of flashlamps are assembled within a disposable mounting have been favorably received by the consuming public. Certain of these mountings are fashioned as a cubic package in which four flashlamps and associated reflectors face outwardly through four surfaces of the cubic form. These surfaces are moved sequentially into a flash illuminating orientation by a mechanical rotation assembly coupled with an exposure mechanism of a camera. Sequential switching between the flashlamps within the cube is accomplished as an adjunct to the mechanical rotation of the lamp mounting. Should an inoperative flashlamp be encountered in the course of taking flash illuminated photographs with the cube, the attempted exposure will be aborted, usually with an attendant loss of a frame of film. The relatively extended length of time required to mechanically sequence another flashlamp into position for ignition precludes the availability of "back-up" illumination with the flash cube system.

In another multiple flashlamp arrangement, a plurality of flashlamps are mounted as an array within a singular disposable package. All of the thus arrayed lamps are oriented for providing scene illumination when ignited without recourse to moving or rotating either the flashlamps or their mountings between exposures. Since no relative movement of the flashlamps is involved between exposures, switching systems are required to cause synchronous igniting of individual bulbs with each actuation of a photographic exposure system. Generally, firing circuits are provided which sequentially ignite the bulbs in a predetermined order from first to last with each actuation of a flash-shutter synchronization switch.

A variety of sequencing circuits for firing flashbulbs in successional order have been proposed. In one category of these circuits, sensing elements are arranged to respond to the heat or light output of an igniting flashbulb by varying either a mechanical or electrical parameter. Following this parameter variation, the circuits enable or arm select lamps within an array for successional firing. In most cases, however, such sequencing devices are either self-destructing when used or require excessive packaging volumes for camera mounted applications. Additionally, the systems are incapable of bypassing any inoperative flashbulbs which may be present in an array.

In another arrangement, a cascading assembly of electrical resistors or the like are selectively coupled within a grouping of flashlamp circuits. During operation, lamp igniting currents are selectively attenuated to cause the flashlamps within the circuits to be fired in succession. In addition to being somewhat sensitive to any variations in power supply or circuit performance, this form of successional system is also incapable of bypassing inoperative flashlamps within an array and must rely upon an open circuit condition at the terminals of any expended lamp to continue a lamp sequencing function.

Solid state electronic logic switching systems have been proposed which offer the important advantages of being fabricable in miniature or integrated circuit fashion. The small size of these circuits permits their permanent mounting within camera structures. Monolithic integrated circuit sequencing systems thus far proposed, however, have not retained the capability of bypassing inoperative or defective flashlamps within the array. Because of the very high production volumes involved in the manufacture of multiple lamp units, it can be projected that a statistically determinable number of the units will contain one or more defective flashlamps. It is important, therefore, that logic circuits which provide for a switching sequence for firing the lamps be capable of bypassing inoperative lamps before or at the commencement of each photographic exposure cycle.

The general structure of a flashlamp with which logic sequencing circuits must operate includes a glass envelope within which is sealed a quantity of combustible filamentary strand material or the like and a combustion supporting gas. This combustible component of a lamp is positioned in intimate relationship with the filament of an igniting assembly electrically coupled across the input leads of the lamp. Upon application of current to the terminals of the lamp, the igniting filament rapidly heats to the combustion point of the strand material and flash ignition ensues. Following ignition, the igniting filament as well as the strand material is melted and/or reduced to an ash residue which remains within the glass envelope. As a result, the terminals leading into the glass envelope are open circuited and the switching circuit to which they are coupled witnesses an infinite resistance. Should the igniting filament or strand material incompletely combust and short the otherwise open circuited terminals of a lamp, a relatively high resistance will be witnessed across the terminals. Similarly, following ignition, a statistical probability exists that the terminals of flashlamps may evidence low resistance shorts, for instance, of about 3 ohms. As above, such shorts may be caused by the vagaries of the process of combustion of materials within a lamp. Such spuriously occasioned resistances will cause a failure of sequence firing circuits relying upon open circuit lamp terminal conditions for their operational logic.

In addition to the desirability of a logic sequencing system responding to the above-noted post ignition short and open circuit conditions, the system should bypass any bulb evidencing defective operational characteristics while still guaranteeing that one bulb within the array will be ignited at the proper time in any exposure. This characteristic is sometimes referred to as a "gauranteed flash capability." Logic systems providing such capability have heretofore required the incorporation of discrete components within a circuit structure. These components, such as capacitors or sensing elements, require the use of more expensive and, therefore, undesirable hybrid integrated circuit structures as opposed to monolithic circuits.

Such requirements impose elevated manufacturing costs as well as result in higher packaging volumes.

SUMMARY OF THE INVENTION

The present invention is addressed to a fully electronic control circuit for sequentially igniting each flashlamp of a series array of flashlamps in response to an electrical firing signal. The invention features a flashlamp pre-test system in which monitoring currents are introduced to individual lamps within a flashlamp array to derive alignment signals. These signals are utilized with each actuation of a photographic camera shutter release system to assure that only valid or operative flashbulbs will be ignited during a photographic exposure.

Another feature and object of the invention is to provide new and improved electronic flash sequencing systems having circuits employing solid state switching devices and capable of high volume, low cost fabrication as monolithic integrated circuits. The circuits of the invention retain the capability of flashing between individual flashlamps within an array at relatively high speeds.

The static electronic control system of the invention is further characterized in the use of alignment circuits which function to pass electrical monitoring currents through the terminals of each flashlamp within an arry. These moitoring currents are evaluated by detector systems which, in turn, function to regulate a sequencing circuit. With this arrangement, a form of pre-testing is provided which validates all flashlamps within an array simultaneously with the actuation of an exposure control system. With the system of the invention no attempt is made by the sequencing circuit to fire an inoperative or defective flashlamp.

Another object and feature of the invention is to provide a photographic exposure system incorporating a pre-testing static sequencing flashlamp firing circuit.

In one embodiment of the invention, an improved sequencing static electronic firing circuit for sequentially igniting an array of flashlamps comprises a plurality of lamp circuits arranged in a predetermined order. Each of these lamp circuits includes a pair of lamp terminals along with solid state switching means. The lamp circuits are coupled with a power supply and the individual flashlamps therewithin are fired upon actuation of the solid state switching means. Each of the lamp circuits is coupled in turn with a sequence logic network the components of which are selectively energized to provide the aforedescribed total circuit alignment at a predetermined time and within an exposure cycle. The sequence logic network is, in turn, controlled by earlier described monitoring and detecting arrangement of the invention.

Another feature and embodiment of the invention provides a flashlamp monitoring arrangement which is formed in a bridge configuration, a flashlamp forming the resistive component of one side of the bridge. A second resistance within the bridge side is selectively inserted for purposes of passing a monitoring current through this flashlamp, however, the current limiting resistive element is removed immediately if the monitor test lamp is valid or operative.

Another feature and object of the invention is to provide an improved sequencing electronic flash firing system which incorporates means for inhibiting the passage of relatively higher firing currents into inoperative flashlamps evidencing low resistance shorts. This feature prevents excessive drain of the power supply in a flash synchronization circuit otherwise caused by low resistance bulb shortings.

Further objects and advantages of the present invention will become readily apparent as the following detailed description of the invention unfolds and when taken in conjunction with the drawings.

DETAILED DESCRIPTION

The flashlamp sequencing system of the invention is characterized in an arrangement for aligning the switching function of each flashlamp in an array of flashlamps in a manner wherein the lamps will be fired in succession with each actuation of an exposure control flash synchronization function. Alignment is achieved through the use of monitoring currents which are introduced into the arrayed lamps and simultaneously evaluated to detect the presence of inoperative lamp units. Simultaneously with the inoperative lamp detection function, the switching operation for each flashlamp is selectively enabled or disabled in accordance with a predetermined sequencing logic. In the generalized and specific embodiments of the invention described herein, actuation of the sequencing system is provided by a fully electronic switching circuit which responds to an electrical event derived from an exposure control circuit to provide a switching function. It should be understood that any form of flash synchronization switching can be used with the sequencing system of the invention. The synchronization switching circuit illustrated herein, however, derives numerous advantages over conventional switching techniques and is described in a copending application for United States Patent entitled, "Flash Synchronization Circuit for Sequential Firing of an Array of Flashbulbs," by J. P. Burgarella and S. Ellin, Ser. No. 844,470 filed July 24, 1969 and assigned to the assignee the instant application.

Figure 1:
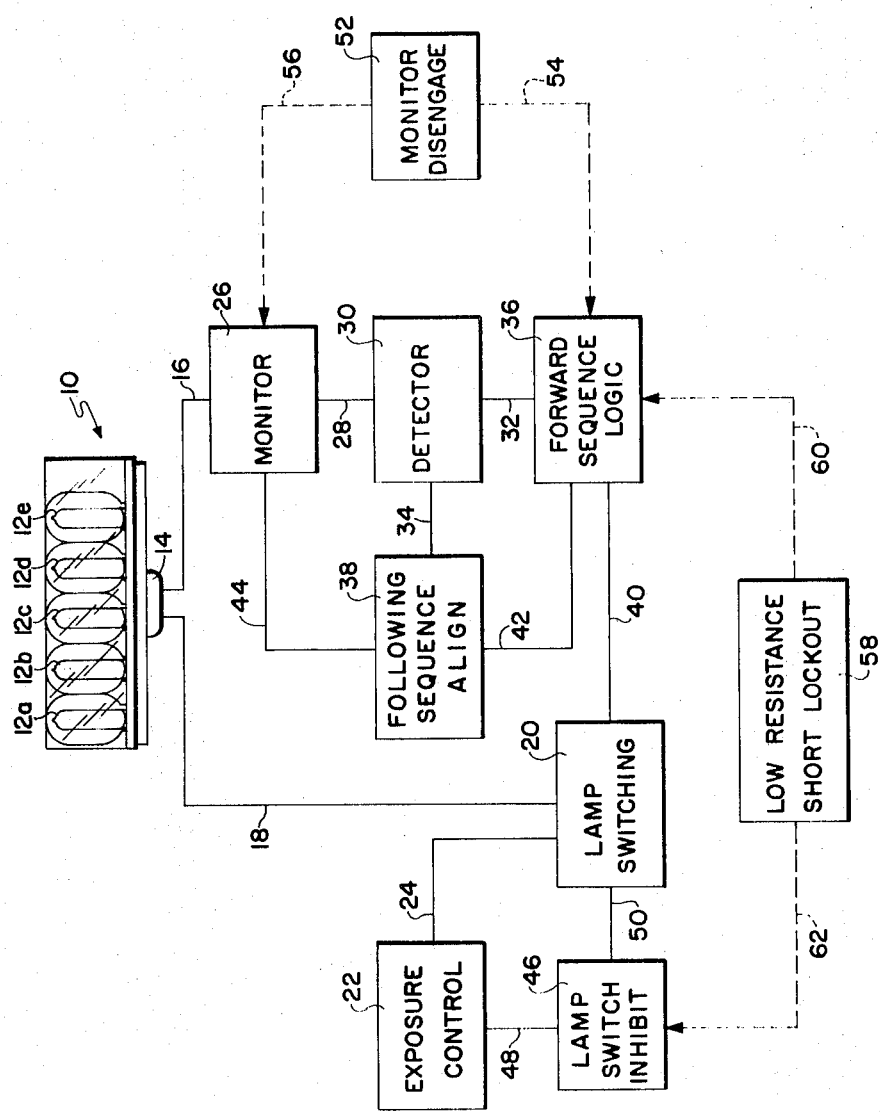
FIG. 1 is a block diagram illustrating an exposure system according to the invention, illustrating in dashed line fashion optional features of certain inventive embodiments.

Referring to FIG. 1, the characteristic components performing the sequencing operations of the invention are illustrated functionally in block form. A disposable package containing a linear array of flashlamps is pictured at 10. In normal operation, the igniting filament of each lamp will evidence an electrical resistance of about 1 ohm to a current applied to the lamp terminals across which it is suspended. This ohmic value may vary as high as about 50 ohms, however, above this value the probability for the presence of a lamp defect increases considerably. Accordingly, the alignment function of the system of the invention is designed for response to a predetermined maximum value of the impedance evidenced at the terminals of any lamp. The terminals of individual flashlamps 12a–12e within the array 10 are grouped at a common connecting plug 14 for individual connection into a sequencing logic circuit and a flash synchronization switching circuit. This operational coupling is depicted generally by lines 16 and 18. A control over igniting currents introduced to each flashlamp 12a–12e is provided by a Lamp Switching function 20. Lamp Switching function 20 is actuated in response to a flash synchronizing signal derived in an Exposure Control system as shown at 22. The functional coupling between Lamp Switching 20 and the Exposure Control system 22 is indicated by a line 24. An exposure control system typical of those which may be used with the instant invention is fully described in a copending application for patent entitled, "Exposure Control System," by John P. Burgarella, Ser. No. 837,688, filed June 30, 1969 and assigned to the assignee of the present application.

Flashlamps 12a–12e within array 10 are aligned for sequential firing by connection through line 16 to an alignment means which includes a Monitor 26. Monitor 26 is operative to pass a test electrical current through individual unfired flashlamps 12a–12e. The value of this test current is selected below that required to cause the flashlamps to ignite or become damaged without ignition. The output signals of Monitor 26 are introduced along line 28 to a Detector function 30 responsive to the individual values of these outputs. Should a flashlamp 12a–12e through which a test electrical current has been passed evidence a resistance above a predetermined value, for instance, 4 ohms, the corresponding output of Detector 30 at lines 32 and 34 will be representative of an inoperative flashlamp. Should a lamp resistance below that predetermined value be detected at 30, the circuit alignment signals at lines 32 and 34 will represent information that the tested flashlamp 12a–12e is operable and may be ignited in appropriate sequence.

The circuit alignment signals from Detector function 30 are introduced simultaneously to a Forward Sequence Logic function 36 from along line 32 and to a Following Sequence Align function 38 from along line 34.

Forward Sequence Logic function 36 serves to enable the lamps 12a–12e within array 10 to be fired successionally in any predetermined firing order. In operation, sequence logic function 36 selectively enables individual lamp switching circuits at 20, an operative association indicated at line 40.

Should an inoperative flashlight 12a–12e be detected at any intermediate position in the firing order of the array 10, Following Sequence Align function 38 will readjust Forward Sequence Logic function 36 in a manner assuring that valid or operative flashlamps 12a–12e preceding any inoperative lamp in their firing order will be fired before firing any valid lamp positioned subsequent to the inoperative lamp in the firing order. The association of the Following Sequence Alignment function 38 with Forward Sequence Logic function 36 is indicated at line 42. Function 38 is also operatively connected with the Monitor function 36 as indicated by line 44.

The flash synchronization system of the above-referenced application for U.S. patent by J. P. Burgarella and S. Ellin is characterized in providing an initial energization of the flash array at 10 simultaneously with an arrangement which inhibits Lamp Switching function 20. This Lamp Switch Inhibit arrangement is indicated functionally at 46. Inhibiting function 46 is operatively associated with exposure control 22 along line 48 and with Lamp Switching 20 along line 50. Actual firing of a flashlamp 12a–12e within array 10 is effected by selectively de-energizing Lamp Switch Inhibit function 46 while continuously energizing the array 10 from a power supply.

Figure 2:
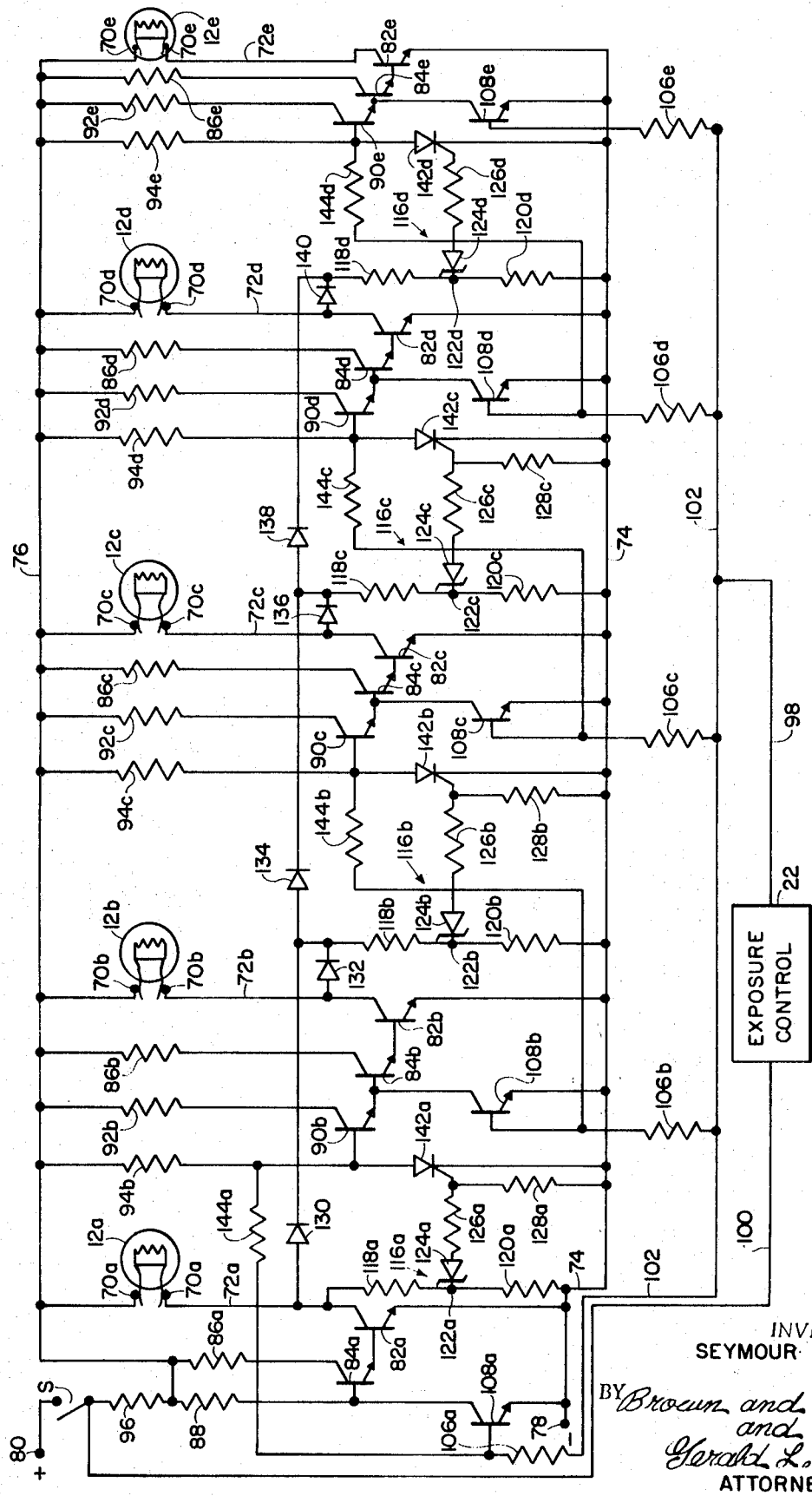
FIG. 2 is a schematic circuit diagram of one version of the improved sequencing static electronic flashing circuit constructed in accordance with the invention.

Referring to FIG. 2, a first detailed embodiment of the sequencing logic system of the invention is portrayed. In the figure, five flashlamps 12a through 12e are illustrated having numerical identification identical to those illustrated in FIG. 1. This numeration is retained throughout all embodiments described herein as well as numeration identifying exposure control function 22.

Flashlamps 12a to 12e are connected respectively within five lamp circuits, each including terminal means for providing electrical contact with terminals of a flashlamp and a switching function as earlier identified at block 20 in FIG. 1.

Terminal means for flashlamps 12a–12e respectively are depicted schematically at 70a to 70e. These terminals introduce select currents into the igniting filaments of each of the flashlamps from lamp circuit lines shown respectively at 72a to 72e. Circuit lines 72a–72e connect each of the lamp circuits in parallel circuit relationship to one another between power or bus leads 74 and 76, which, in turn, are connected respectively with power input terminals 78 and 80. A main power switch "S" selectively energizes the entire system.

The Lamp Switching function for the lamp circuits is carried out by Darlington connected transistor pairs having NPN transistor switching stages 82a–82e, the emitter and collector terminals of which are coupled respectively within lines 72a–72e between power leads 74 and 76 and in series circuit relationship respectively with flashlamps within terminals 70a to 70e. The base terminals of switching transistor stages 82a–82e are, in turn, coupled respectively with the emitters of input NPN transistor stages 84a to 84e. The collectors of input stage transistors 84a–84e are coupled respectively through current limiting resistors 86a to 86e to power lead 76. Forward bias for the base of input transistor stage 84a is supplied from power lead 76 and a bias resistor 88.

The base terminals of input transistor stages 84b to 84e are coupled respectively to the emitter terminals of NPN holding transistors 90b through 90e, while their collector terminals are coupled to power lead 76 through current limiting resistors 90b through 92e. Forward biasing current for holding transistors 90b–90e is provided by the connection of their base terminals with power lead 76 respectively through bias resistors 94b to 94e. A current limiting resistor 96 is coupled in power lead 76 between one terminal of switch S and the parallel connected flashlamp circuits.

Basic switching permitting the passage of an igniting current through flashlamps 12a–12e is accomplished by turning "on" an appropriate switching transistor stage as at 82a–82e. As is known in the art, with Darlington connected transistor pairs this is accomplished by forward biasing the base-emitter junctions of a corresponding input transistor stage 84a–84e. Forward biasing current for input stage transistor 84a is supplied from lead 76 through resistor 88. Such forward biasing permits the concurrent passage of current from resistor 86a into the base-emitter junction of transistor 82a. The same general switching function is provided with the remaining Darlington connected transistor pairs (82b, 84b)–(82e, 84e) except for the presence of holding transistors 90b through 90e. These latter transistors, when forward biased respectively from power lead 76 and biasing resistors 94b–94e, will insert a forward biasing current from lead 76 respectively through resistors 92b–92e to forward bias the base-emitter junctions of input stage transistors 84b–84e.

The flash synchronization system represented by functional block 22 includes a fully electronic flash synchronization switching circuit. This synchronization switching circuit responds to an electrical event derived from the control circuit and regulating apparatus of an exposure system to provide flash synchronization output signals. These signals are introduced through appropriate interconnections depicted only generally by a line 98 to the earlier described Lamp Switch Inhibit function 46. Exposure Control system 22 as well as the instant sequencing system are energized upon closure of main power switch S. Energizing response of exposure control 22 to a closure of switch S is derived from input lead 100.

The Lamp Switch Inhibit function, which is regulated from line 98, is selectively operative to disable the switching function of each lamp circuit by preventing Darlington connected transistor pairs (82a, 84a) through (82e, 84e) from turning "on." Lines 98 and 102 couple exposure control 22 respectively through resistors 106a to 106e with the base terminals of NPN inhibit transistors 108a through 108e. The collector terminals of inhibit transistors 108a–108e are coupled respectively with the base terminals of input stage transistors 84a–84e, while the emitter terminals of the inhibit transistors are connected with bus lead 74. Thus connected, a forward bias imposed from bias resistor 106a into the base-emitter junction of inhibit transistor 108a will cause it to assume an "on" status. This resultant conductive status will cause the forward biasing currents otherwise present at the base-emitter junction of input stage transistor 84a to be shunted to bus lead 78. A prevention of this input transistor stage forward bias, in turn, disables any forward bias at switching stage transistor 82a. Similarly, the presence of a forward bias across the base-emitter junctions of inhibit transistors 108b through 108e will prevent the formation of a forward bias at the corresponding base-emitter junctions of transistor input stages 84b–84e by shunting biasing currents derived from the emitter terminals of holding transistors 90b through 90e. From the foregoing, it will be seen that an "on" status at any inhibit transistor 108a–108e will cause a corresponding input stage transistor 84a–84e to assume an "off" status. Conversely, the assumption of an "off" status by any inhibit transistor 108a–108e will cause a corresponding one of the input stage transistors 84a–84e to assume an "on" status. The latter "on" status will cause paired transistors (82a, 84a) to (82e, 84e) to be forward biased into conduction and permit the passage of an igniting current between power leads 74 and 76 and an enabled corresponding flashlamp within lamp array 12a–12e.

The foregoing lamp firing procedure requires an initial closure of switch S which causes exposure control 22 to impose a forward bias across the base-emitter junctions of inhibit transistors 108a–108e. At an appropriate time within an exposure cycle, exposure control 22 will deactivate the forward biasing current introduced along line 98, thereby causing all inhibit transistors 108a through 108e to assume an "off" status. Without further control, this status will permit the ignition of each of the flashlamps 12a through 12e. At a select point in time following the firing or igniting of one select flashlamp of the array 12a–12e, exposure control 22 is operative to reinsert a current from along line 98 into the Lamp Switch Inhibit function causing the return of inhibit transistors 108a–108e to an "on" status. This status remains until switch S is opened at the termination of an exposure cycle.

The monitoring function of the present system provides for the passing of a current of limited predetermined maximum value through each unexpended flashlamp 12a–12e. This monitoring current is generated prior to the ignition of a given one of the flashlamps and, in the instant embodiment, is derived through a combination of current limiting resistor 96 with voltage divider networks 116a through 116b. Voltage divider networks 116a–116d are formed respectively from resistors 118a–118d and 120a–120d. Voltage dividing resistors 118a–118d and 120a–120d are coupled to form central junctions respectively at 122a–122d. Networks 116a–116d are coupled with corresponding flashlamp circuits between power lead 74 and a point permitting current to selectively bypass transistor switching stages 82a–82d. Note that for networks 116b–116d, connection to this point is made respectively through unilaterally conducting means such as diodes 132, 136 and 140.

The monitoring operation of the present embodiment is activated at the commencement of an exposure cycle when switch S is closed and switching transistor stages 82a through 82e are held in an "off" status by virtue of an "on" status at inhibit transistors 108a–108e. By appropriately selecting the values of resistance at resistor 96 and networks 116a–116d, preliminary monitoring test current passing through the ignitor filaments of each of the unexpended flashlamps 112a through 112d will be at levels insufficient to cause lamp ignition. If the flashlamps are in an operative or valid condition, the test monitoring currents will derive a voltage of at least a predetermined level at respective voltage divider network junctions 122a–122d. The electrical status of junctions 122a–122d represents a monitoring output signal. Should one of the flashlamps evidence an excessive resistance, for instance above 50 ohms, the voltage at its corresponding voltage divider junction will be below the aforesaid predetermined value.

The detector function of the present embodiment is assumed by Zener diodes 124a–124d which are coupled respectively to junctions 122a–122d. Diodes 124a–124d are selected having voltage break-over levels corresponding to the above-described predetermined voltage level value established at junctions 122a–122d. Zener diodes 124a–124d are coupled respectively through current limiting resistors 126a through 126d to the gate terminals of gate controlled switching means respectively identified at 142a through 142d. The gate terminals of gate control switching means 142a–142c are additionally coupled respectively through current limiting resistors 128a–128c to power lead 74.

Zener diodes 124a through 124d perform the earlier described detector function by permitting the conduction of gate drive currents into switching means 142a–142d only when voltage levels representative of the passage of a monitoring current through an operative flashlamp are present at junctions 122a through 122d. The output status of diodes 124a–124d represents circuit alignment signals.

Gate controlled switch means 142a–142d serve as control stages and may be thyristor devices having a latching characteristic. In the embodiments depicted, the devices 142a–142d are silicon controlled rectifiers having their cathodes connected to the negative D.C. supply lead 74 and their anodes connected respectively through current limiting resistors 94b–94e to lead 76. The silicon controlled rectifier (SCR) is also known as a gate controlled thyristor and is a well-known semiconductor switching device which can be rendered conductive when its anode voltage is positive with respect to its cathode and upon the application of a gating signal to its gate electrode, but thereafter the gate electrode looses control over conduction through the device and to commutate or turn it off, it is necessary to reduce the current through the device to a value below the holding current or to make the anode potential negative relative to the cathode potential. Of course, other gate control switching elements may be used in place of the SCR's illustrated.

Thus coupled within the circuit illustrated, SCR's 142a–142d serve as the Forward Sequence Logic function described in FIG. 1 in connection with box 36. The SCR's 142a–142d are arranged with respect to flashlamps 12a–12e so as to provide a forward successional order of flashlamp firing commencing with lamp 12a and progressing by alphabetical suffix through lamp 12e. Assuming that all of the flashlamps 12a–12e are operative or valid, the forward sequencing logic operates as follows:

At the commencement of an exposure cycle, switch S is closed and the Lamp Switch Inhibit function causes transistor switching stages 82a–82e to assume an "off" status. Monitoring currents are drawn through flashbulbs 12a through 12d and to form voltages which are detected at respective Zener diodes 124a through 124d. Inasmuch as all flashlamps are assumed valid, a gate drive current will be passed through diodes 124a–124d to gate respective SCR's 142a–142d into conduction. Thus gated, each SCR will shunt currents otherwise serving to forward bias the base-emitter junctions of each corresponding holding transistor 90b–90e which succeeds a given SCR in the preestablished firing order. An "off" status at any given holding transistor 90b–90e will cause the Darlington coupled transistor pair (82b, 84b)–(82e, 84e) to which it is coupled to remain in an "off" status, thereby permitting the next following detector function to gate the next following SCR 142b–142d into conduction. This forward sequencing operational pattern carries through the entire circuit. Note that the final flashlamp 12e within the predetermined firing order is not monitored.

At an appropriate time within the exposure cycle, exposure control 22 will cause inhibit transistors 108a through 108e to assume an "off" status, thereby causing transistor pair (82a, 84a) to assume an "on" status to permit the passage of igniting current through flashlamp 12a. The remaining flashlamps 12b through 12e will not be ignited at this time inasmuch as SCR's 142a through 142d will remain in a conductive status by virtue of their latching characteristic. This conductive status holds "off" the next following Lamp Switching function as earlier described. The function of holding transistors 90b through 90e may be more apparent at this point in the description. Should inhibit transistors 108b through 108e have been coupled respectively in series with SCR's 142a through 142d, these SCR's would have been drawn to an "off" or nonconducting status prematurely at the point in time when exposure control 22 removed the forward bias upon the inhibit transistors. With the arrangement shown, the inhibit transistors can cause a succeeding switching function such as transistor pairs (82b, 84b) through (82e, 84e) to assume an "on" status without hindering the conductive status of a preceding SCR as at 142a–142d.

The sequencing means of the invention also includes a Following Sequence Align function earlier described in connection with block 38 of FIG. 1. Function 38 serves to align the firing order of the circuit for any situation wherein a flashlamp 12b through 12d intermediate the first (12a) and last (12e) flashlamp within the predetermined firing order is inoperative. The alignment function is provided in the present embodiment by unilaterally conductive devices such as diodes 130–140 which are connected from one side of the terminals 70a–70d of a given flashlamp to the inputs of succeeding voltage divider networks 116b through 116d. The diodes 130–140 serve to pass a monitoring current from flashlamps preceding others in the firing order to all succeeding flashlamps. Consequently, flashlamps succeeding any inoperative flashlamps intermediately situated within the firing order will not be ignited simultaneously with flashlamps preceding that inoperative one. For example, if flashlamp 12c is inoperative and open-circuited while the remaining lamps 12a, 12b, 12d and 12e are operative, lamp 12d would be fired simultaneously with lamp 12a without the presence of monitoring current passing through diodes 130, 132 and 134 into voltage divider network 116c to gate SCR 142c into conduction and thereby permitting switching transistors 82d and 82e to be held in an "off" status.

As a further feature of the instant circuit embodiment, current limiting resistors 144a–144d are coupled between the anode terminal side of respective SCR's 142a–142d to the respective base terminals of inhibit transistors 108a–108d preceding the said SCR's in the firing order of lamps 12a–12e. After the firing of a given flashlamp 12a–12d, these resistors reassert an "on" status at an associated inhibit transistor 108a–108d, thereby preventing the passage of unnecessary currents through corresponding Darlington coupled transistor pair (82a, 84a)–(82d, 84d). Note that any given inhibit transistor 108a–108d only turns "on" in this mode when a succeeding SCR 142a–142d is in a nonconducting state by virtue of the absence of a gate drive signal.

Figure 3:
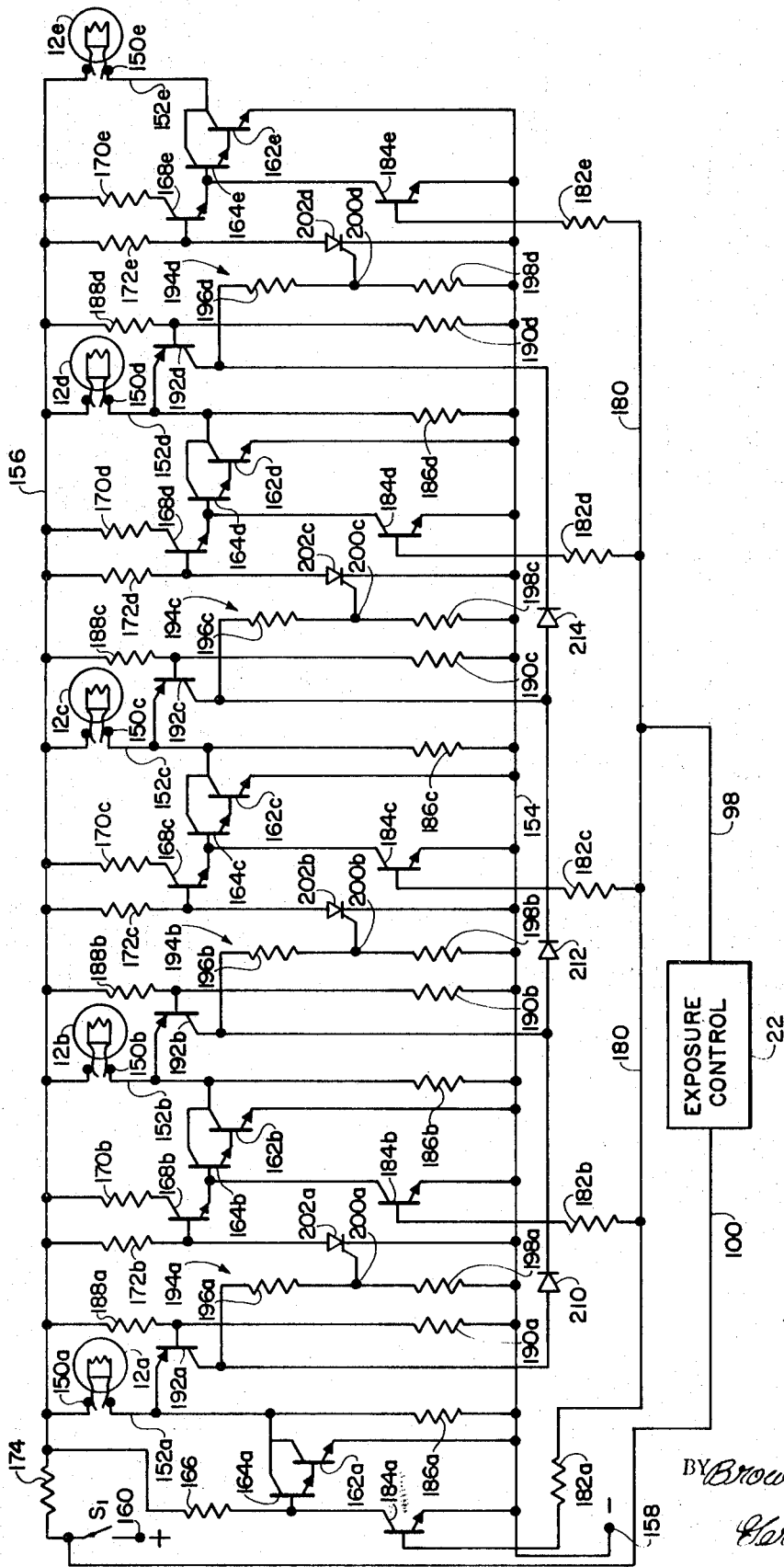
FIG. 3 is a schematic circuit diagram of another embodiment of the electronic flashlamp selection system of the invention showing the views of bridge circuits for developing monitoring means.

Referring to FIG. 3, a second detailed embodiment of the sequencing logic system of the invention is portrayed. The flashlamp array of the embodiment includes terminal means 150a–150e across which are electrically coupled the ignitor filaments of associated flashlamps 12a–12e. Terminal means 150a–150e respectively are part of five lamp circuits which additionally include a Lamp Switching function as earlier described in connection with block 20 in FIG. 1.

Terminal means 150a–150e introduce select currents into the igniting filaments of each of the flashlamps from circuit lines respectively shown at 152a–152e. Lines 152a–152e provide in part for the connection of each of the lamp circuits in parallel circuit relationship to one another between power leads 154 and 156. Leads 154 and 156 are connected respectively with power supply input terminals 158 and 160. A main power switch $S_1$ selectively energizes the entire system.

The Lamp Switching function for the lamp circuits is carried out by NPN transistor switching stages 162a–162e, the collector terminals of which are coupled respectively to flashlamp terminal means 150a–150e through corresponding circuit lines 152a–152e. The emitter terminals of transistor stages 162a–162e are connected to power lead 154. The base terminals of transistor stages 162a–162e are coupled respectively with the emitters of input NPN transistor stages 164a–164e, while their respective collector terminals are coupled in common. Forward biasing current for the base of input transistor stage 164a is supplied from power lead 156 through a bias resistor 166.

The base terminals of input transistor stages 164b–164e are coupled respectively to the emitter terminals of NPN holding transistors 168b through 168e, while the collector terminals of these input stages are coupled in common with the corresponding collectors of transistor switching stages 162b–162e. The collectors of holding transistors 168b–168e are coupled to power lead 156 through current limiting resistors 170b through 170e. Forward biasing current for holding transistors 168b–168e is derived by the connection of their base terminals with power lead 156 respectively through resistors 172b to 172e. A current limiting resistor 174 is coupled in power lead 156 between one terminal side of switch $S_1$ and the flashlamp circuits.

Lamp switching permitting the ignition of flashlamps within each of the lamp circuits is carried out by turning "on" a selected switching transistor stage as at 164a–164e. As in the initial embodiment, this is accomplished by forward biasing a corresponding input transistor stage 164a–164e. Forward biasing current for input stage transistor 164a is supplied from power lead 156 through resistor 166. Such forward biasing permits the concurrent passage of current from power lead 156 through lamp 12a, line 152a, across transistor pair (162a, 164a) to power lead 154. A similar switching mode is provided with the remaining Darlington connected transistor pairs (162b, 164b)–(162e, 164e) except for the presence of holding transistors 168b–168e. Transistors 168b–168e, when forward biased from lead 156 through biasing resistors 172b–172e, will provide forward biasing current from power lead 156 respectively through resistors 170b–170e for the base-emitter junctions of input stage transistors 164b–164e.

The system of the present embodiment is operated by closing switch $S_1$ and causing the commencement of an exposure cycle at exposure control function 22 which is coupled into the sequencing circuit through lines 98 and 100. Exposure control system 22 operates in the present embodiment in identical fashion as described in detail in connection with FIGS. 1 and 2.

The Lamp Switch Inhibit function, which is regulated from control 22 and line 98, is selectively operative to disable the switching function of each lamp circuit by preventing Darlington connected transistor pairs (162a, 164a) through (162e, 164e) from turning "on." Lines 98 and 180 couple exposure control 22 respectively through resistors 182a–182e with the respective base terminals of NPN inhibit transistors 184a–184e. The collector terminals of inhibit transistors 184a–184e are coupled respectively with the base terminals of input stage transistors 164a–164e, while the emitter terminals of the inhibit transistors are connected with power lead 154. Thus connected, a forward bias imposed from bias resistor 182a into the base-emitter junction of inhibit transistor 184a will cause the latter to assume an "on" status. This resultant conductive status will cause biasing currents otherwise present at the base-emitter junction of input stage transistor 164a to be shunted through inhibit transistor 184a to lead 154. Accordingly, Darlington transistor pair (162a, 164a) will assume an "off" status. Similarly, the presence of a forward bias across the base-emitter junctions of inhibit transistors 184b–184e will prevent the formation of a forward bias at the corresponding base-emitter junctions of transistor input stages 164b–164e by shunting biasing currents derived from the emitter terminals of holding transistors 168b–168e. From the foregoing, it may be seen that an "on" status at any inhibit transistor 184a–184e will cause a corresponding Darlington connected transistor pair (162a, 164a)–(162e, 164e) to assume an "off" status. Conversely, the assumption of an "off" status by any inhibit transistor 184a–184e will permit a corresponding one of the input stage transistors 164a–164e to assume an "on" status. The latter "on" status will cause an associated paired switching transistor 162a–162e to assume an "on" status and, switching without further regulation as discussed below, permit ignition of a corresponding flashlamp 12a–12e.

As in the earlier embodiment, the removal of a forward bias at inhibit transistors 184a–184e is caused at an appropriate time following the closure of switch $S_1$ by exposure control 22. Sequential regulation of the firing of flashlamps 12a–12e is imposed during this "off" status of inhibit transistors 184a–184e by the Monitoring, Detecting and Sequencing functions of the system.

The Monitor function of the instant embodiment is present as a bridge configuration, one side of which is formed by the resistance exhibited by a flashlamp 12a–12d along with a corresponding series connected divider resistor 186a–186d. The opposite sides of the bridge configurations are formed respectively by series connected divider resistors 188a–188d and 190a–190d connected between power leads 154 and 156. Monitoring current detection is accomplished by a bridge difference signal detector formed by a PNP transistor as at 192a–192d. Connection of each transistor 192a–192d across an associated bridge is made from its emitter and base terminals. The collector terminals of each detector transistor 192a–192d are coupled to lead 154 respectively through voltage divider networks 194a–194d. Voltage divider networks 194a–194d are formed respectively from resistors 196a–196d and 198a–198d which are coupled as in the earlier embodiment to form central junctions respectively at 200a–200d.

During a pre-ignition test phase of the operation of the system, monitoring currents passing through flashlamps 12a–12d will be limited by associated bridge resistors 186a–186d. The latter resistors have resistance values selected for limiting the monitoring currents to relatively low values. By appropriately selecting the values of bridge resistances 188a–188d and 190a–190d, a bridge unbalance may be derived forming a difference signal which forward biases detector transistors 192a–192d only at given levels of impedance at an associated flashlamp. For instance, the divider resistors 186–190 with appropriate suffixes may have resistance values proportioned such that the base of detector transistor 192 with appropriate suffix is about one volt below the applied voltage. For a normal low resistance across the igniting filament of any given lamp 12a–12d, the detector transistor 192a–192d associated therewith will be forward biased. When flashlamp resistance changes after it is fired, the associated detector transistor 192a–192d will be back biased. Therefore, for any flashlamp 12a–12d which evidences an operational defect by virtue of a relatively higher resistance, for instance about 30 ohms, its associated detector transistor 192a–192d will be back biased to provide a signal for appropriately aligning the sequencing circuit.

When forward biased to indicate the presence of an operative flashlamp, detector transistors 192a–192d provide a signal output of select voltage level at the junctions 200a–200d of associated voltage dividing networks 194a–194d. Junctions 200a–200d are coupled respectively to the gate terminals of gate controlled switching means 202a–202d. As in the earlier embodiment, gate controlled switching means 202a–202d may be thyristor devices having latching characteristics and are shown as silicon controlled rectifiers (SCR). Upon receiving a gate drive signal from an associated detector transistor 192a–192d, each SCR 202a–202d will assume a conductive status until unlatched.

Similar to the embodiment of FIG. 2, SCR's 202a–202d serve as the Forward Sequence Logic function described in FIG. 1 in connection with box 36. The SCR's 202a–202d are arranged with respect to flashlamps 12a–12e so as to provide a forward successional order of flashlamp firing commencing with lamp 12a and progressing by alphabetical suffix through lamp 12e. Assuming that all of the flashlamps 12a–12e are operative or valid, the Forward Sequencing Logic operates as follows:

At the commencement of an exposure cycle, switch $S_1$ is closed and the Lamp Switch Inhibit function causes transistor switching stages 162a–162e to assume an "off" status. Monitoring currents are drawn through flashlamps 12a–12d and are detected by forwardly biased detector transistors 192a–192d. Inasmuch as all flashlamps are assumed valid, a gate drive current will be passed into the gate terminals of respective SCR's 202a–202d to render them conductive. When gated, each SCR 202a–202d will shunt currents otherwise serving to forward bias the base-emitter junctions of each corresponding holding transistor 168a–168e which succeeds a given SCR 202a–202d in the pre-established firing order of the flashlamp array. An "off" status at any given holding transistor 168b–168e will cause the darlington coupled transistor pair (162b, 164b)–(162e, 164e) to which it is coupled to remain in an "off" status, thereby permitting the next following detector function to gate the next following SCR 202b–202d into conduction. This forward sequencing operational pattern carries through the entire circuit. Note that the final flashlamp 12e within the predetermined firing order is not monitored.

At an appropriate time in the exposure cycle, exposure control 22 will cause inhibit transistors 184a–184e to assume an "off" status, thereby causing transistor pair (162a, 164a) to assume an "on" status to permit the passage of igniting current through lamp 12a. The remaining lamps 12b through 12e will not be ignited at this time inasmuch as SCR's 202a–202d will remain in a conductive status by virtue of their latching characteristic. This conductive status folds "off" the next following lamp switching function as earlier described. Holding transistors 168b–168e serve to isolate the switching effects of inhibit transistors 184b–184e from SCR's 202a–202d. For instance, the SCR's 202a–202d would be drawn "off" upon the removal of a forward bias at inhibit transistors 184b–184e during a firing sequence without the presence of the holding transistors.

The sequencing means of the present embodiment also includes a Following Sequence Align function as described in connection with block 38 of FIG. 1. As in the earlier embodiment, the instant function serves to align the firing order of the circuit for any situation wherein a flashlamp 12b–12d intermediate the first (12a) and the last (12e) flashlamps within the predetermined firing order is inoperative. The alignment function is provided by diodes 210, 212 and 214. Diode 210 is connected between the collector of detector transistor 192a and the collector of detector transistor 192b. Diode 212 is connected between the collector of detector transistor 192b and the collector of detector transistor 192c. In similar fashion, diode 214 is coupled between the collector of detector transistor 192c and the collector of detector transistor 192d. These diodes will be seen to cause passage of the monitoring current from any flashlamp preceding another in the firing order into the detector and associated sequencing function of the next flashlamp in the firing order. As a consequence of this arrangement, flashlamps succeeding any inoperative flashlamp intermediately situated within the firing order will not be ignited simultaneously with flashlamps preceding that inoperative one. While structured differently, diodes 210, 212 and 214 achieve the same results as the Following Sequence Align function described in connection with the embodiment of FIG. 2.

As discussed earlier herein, an operative or valid flashlamp will exhibit a relatively low impedance to a monitoring current caused to pass through it. It may be desirable, therefore, that the monitoring and detecting functions of the system be responsive to reject a flashlamp as inoperative when exhibiting impedances very close to those representing an operative lamp, for instance, at about 3 or 4 ohms. Difficulties arise, however, when such low impedance value monitoring is contemplated, inasmuch as relatively high monitoring currents are derived which may cause an inadvertent firing of a flashlamp. If reliably achieved, however, low lamp impedance monitoring can offer additional advantage to the sequencing system. For instance, flashlamps exhibiting low resistance shorts following ignition, for example of about 4 or 5 ohms and above, can be detected and the sequencing circuit adjusted to isolate or open circuit them.

Returning to FIG. 1, a refined version of the circuit of FIG. 3 is illustrated functionally in conjunction with the generalized description of the earlier embodiments. To overcome difficulties encountered with the passage of relatively higher monitoring currents through the lamp array 10, a Monitor Disengage function 52 is coupled as indicated by dashed lines 54 and 56 respectively between Forward Sequence Logic function 36 and the Monitoring function 26. Monitor Disengage function 52 is operative to remove monitoring current passing through a flashlamp simultaneously with the "on" activation of a Forward Sequence Logic function. Additionally, the present embodiment includes a Low Resistance Short Lockout function 58 operatively associated with Forward Sequence Logic function 36 and Lamp Switch Inhibit function 46 and which is operative to disable or switch "off" any lamp circuit evidencing a low resistance short phenomenon. Function 58 is shown associated with Forward Sequence Logic 36 along dashed line 60 and with Lamp Switch Inhibit function 46 along dashed line 62.

Figure 4:
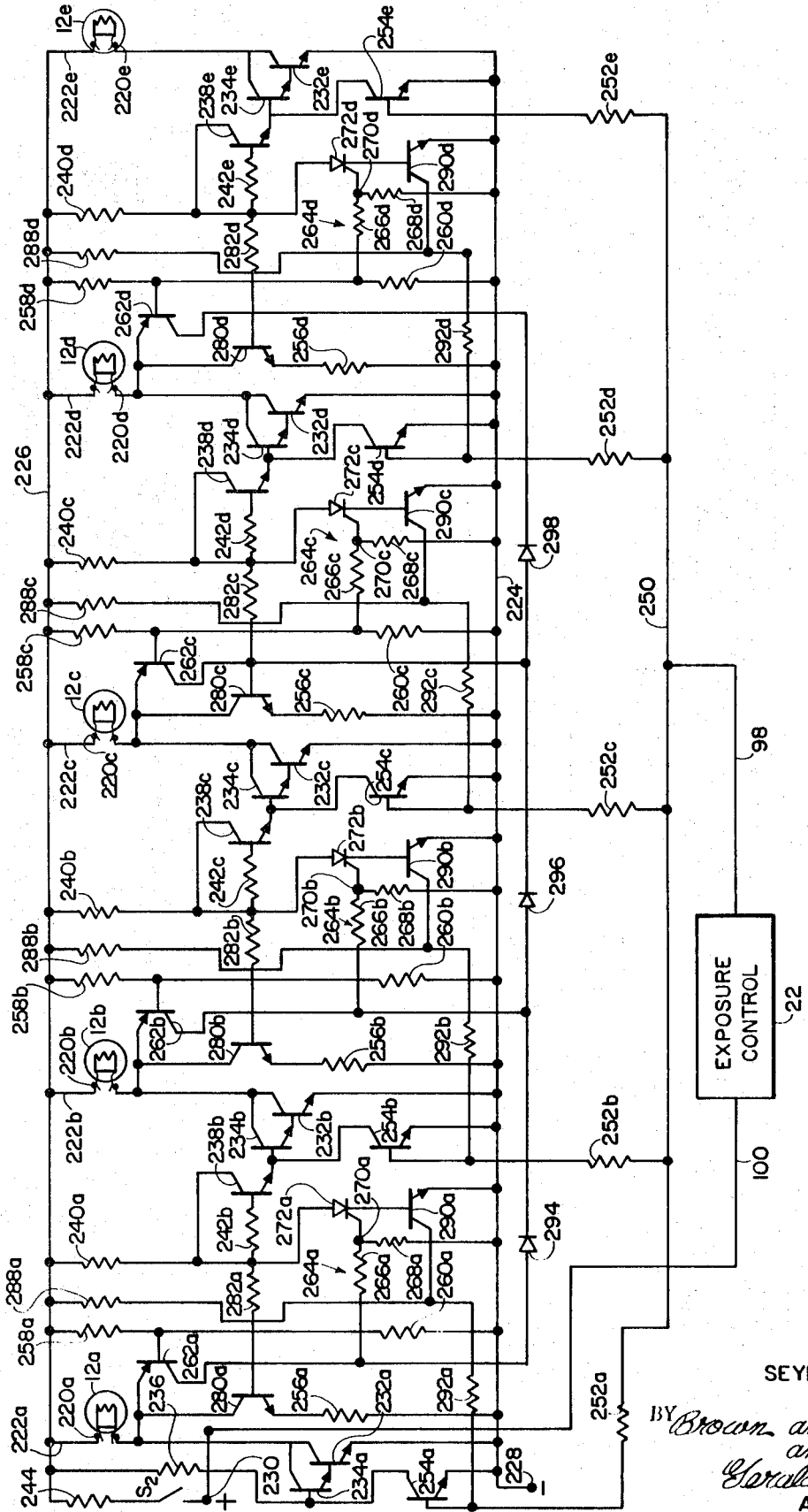
FIG. 4 is a schematic circuit diagram of still another embodiment of the electronic flashlamp selection system of the invention which is characterized in being capable of detecting flashlamp defects evidenced by relatively low lamp resistances.

Referring to FIG. 4, a detailed diagram of the final embodiment is portrayed. The embodiment represents a refinement of the bridge monitoring and detecting arrangement described in connection with the circuit of FIG. 3. As in the earlier circuits, the embodiment includes terminal means 220a–220e across which are electrically coupled the ignitor filaments of associated flashlamps 12a–12e. Terminal means 220a–220e form respective components of five lamp circuits which additionally include a Lamp Switching function as earlier described in connection with block 20 in FIG. 1.

Terminal means 220a–220e introduce select currents into the igniting filaments of each of the flashlamps from circuit lines respectively shown at 222a–222e. Lines 222a–222e provide in part for the connection of each of the lamp circuits in parallel circuit relationship to one another between power leads 224 and 226. Leads 224 and 226 are connected respectively with power supply input terminals 228 and 230. A main power switch $S_2$ selectively energizes the entire system.

Lamp switching for the lamp circiuts is carried out by NPN transistor switching stages 232a–232e, the collectors of which are coupled respectively to flashlamp terminal means 220a–220e through corresponding circuit lines 222a–222e. The emitters of transistor stages 232a–232e are connected to power lead 242. The bases of transistor stages 232a–232e are coupled respectively with the emitters of input NPN transistor stages 234a–234e, while their respective collectors are coupled in common. Forward biasing currents for the base of input transistor stage 234a is supplied from power lead 226 through a bias resistor 236.

The bases of input transistor stages 234a–234e are coupled respectively to the emitters of NPN holding transistors 238b–238e, while the collectors of these input stages are coupled in common with the assoicated collectors of transistor switching stages 234b–234e. The collectors of holding transistors 238b–238e are coupled to power lead 226 through current limiting resistors indicated respectively at 240a–240d. Forward biasing currents for holding transistors 238b–238e are derived by the connection of their base terminals through associated bias resistors 242b–242e with power lead 226 respectively through resistors 240a–240d. A current limiting resistor 244 is coupled in power lead 226 between one terminal side of switch $S_2$ and the flashlamp circuits.

Lamp switching permitting the ignition of flashlamps within each of the lamp circuits is carried out by turning "on" a selected switching transistor stage as at 232a–232e. As in the earlier embodiments, this is accomplished by forward biasing a corresponding input transistor stage 234a–234e. Forward biasing current for input stage transistor 234a is supplied from power lead 226 through 236. Such forward biasing of the darlington connected transistor pair (232a, 234a) permits the passage of current across power leads 234 and 226 and through flashlamp 12a. A similar switching mode is provided with the remaining darlington connected transistor pairs (232b, 234b)–(232e, 234e) with the exception that triggering of these darlington connected transistor pairs is effected through holding transistors 238b–238e. Holding transistors 238b–238e, when forward biased from lead 226 respectively through resistors 240a–240d and resistors 242b–242e, will provide a forward biasing current through power lead 226 which is selectively introduced to the base-emitter junctions of input stage transistors 234b–234e.

The system of the present embodiment is operated by closing switch $S_2$ and causing the commencement of an exposure cycle at exposure control function 22 which is coupled into the sequencing circuit through lines 98 and 100. Exposure control system 22 operates in the present embodiments in identical fashion as described in detail in connection with FIGS. 1, 2 and 3.

The Lamp Switch Inhibit function, which is regulated from control 22 and line 98, is selectively operative to disable the switching function of each lamp circuit by preventing darlington connected transistor pairs (232a, 234a)–(232e, 234e) from turning "on." Lines 98 and 250 couple exposure control 22 through resistors 252a–252e with the respective base terminals of NPN inhibit transistors 254a–254e. The collectors of inhibit transistors 254a–254e are coupled respectively with the base terminals of input stage transistors 234a–234e, while the emitters of the inhibit transistors are connected with power lead 224. Thus connected, a forward bias imposed from bias resistor 252a into the base-emitter junction of inhibit transistor 254a will cause the latter to assume an "on" status. This resultant conductive status caused by passing currents otherwise present at the base-emitter junction of input tranistor 234a to be shunted across inhibit transistor 254a to power lead 224. Accordingly, darlington transistor pair (232a, 234a) will assume an "off" status. Similarly, the presence of a forward bias across the base-emitter junctions of inhibit transistors 254b–254e will prevent the formation of a forward bias at the corresponding base-emitter junctions of transistor input stages 234b–234e by shunting biasing currents derived from the emitters of holding transistors 238b–238e. From the foregoing, it may be seen that an "on" status at any inhibit transistor 254a–254e will cause a corresponding darlington connected transistor pair (232a, 234a)–(232e, 234e) to assume an "off" status. Conversely, the assumption of an "off" status by any inhibit transistor 254a–254e will permit a corresponding said darlington transistor pair to switch "on." The latter "on" status is further controlled by the sequencing function of the system as discussed below.

As in the earlier embodiments, the removal of a forward bias at inhibit transistors 254a–254e is effected at an appropirate time following the closure of switch $S_2$ by exposure control 22. Sequential regulation of the firing of flashlamps 12a–12e is imposed during this "off" status of the inhibit transistors by the monitoring, detecting and sequencing functions of the system.

In order to achieve a sensitivity to relatively low resistors values across the terminals of flashlamps 12a–12d, the Monitor function of the instant embodiment is present as a bridge configuration similar to that described in connection with FIG. 3. One side of the bridge configuration is formed by the resistance exhibited by a flashlamp 12a–12d along with a corresponding series connected divider resistor 256a–256d. To achieve the sensitivity desired, divider resistors 256a–256d are selected having relatively low resistance values which, in turn, draw relatively higher monitoring currents through each of the flashlamps 12a–12d. The opposite sides of the bridge configurations are formed respecetively by divider resistors 258a–258d and 260a–260d connected in series between power leads 224 and 226. Additionally similar to the embodiment described in connection with FIG. 3, monitoring current detection is accomplished by a bridge difference signal detector formed by a PNP transistor as at 262a–262d. Connection of each transistor 262a–262d across an associated bridge configuration is made from its emitter and base terminals. The collector terminals of each detector transsitor 262a–262d are coupled to power lead 224 respectively through voltage divider networks 264a–264d. Networks 264a–264d are formed respectively from resistors 266a–266d and 268a–268d which are coupled as in the earlier embodiments to form central junctions respectively at 270a–270d.

During a pre-ignition test phase of the operation of the system, monitoring currents passing through flashlamps 12a–12d will be limited by resistors 256a–256d present in one side of their associated bridge configurations. The latter resistors have resistance values selected for limiting the monitoring currents to relatively low values. By appropriately selecting the values of bridge resistances 258a–258d and 260a–260d, a bridge unbalance or difference signal may be derived which forward biases detector transistors 262a–262d only for preselected levels of flashlamp impedance. For instance, the divider resistors 256, 258 and 260 with appropriate suffixes may have resistance values proportioned such that the base of detector transistor 262 with appropriate suffix is about a volt below the applied voltage. For a normal low resistance, for instance, one ohm, across the igniting filament of any given lamp 12a–12d, the detector transistor 262a–262d associated therewith will be forward biased. When flashlamp resistance changes after it is fired, the associated detector transistor 262a–262d will be back biased. Therefore, for any flashlamp 12a–12d which evidences an operational defect by virtue of a relatively higher resistance, for instance above 3 ohms, its associated detector transistor 262a–262d will be back biased to provide a signal for appropriately aligning the flashlamp firing order of the circuit.

When forward biased to indicate the presence of an operative flashlamp, detector transistors 262a–262d provide a signal output of select voltage level at the junctions 270a–270d of associated voltage dividing networks 264a–264d. Junctions 270a–270d are coupled respectively to the gate terminals of gate controlled switching means 272a–272d. As in the earlier embodiments, control stages 272a–272d may be thyristor devices having latching characteristics and are shown as silicon controlled rectifiers (SCR). Upon receiving a gate drive signal from an associated detector transistor 262a–262d, each respective SCR 272a–272d will assume a conductive status until unlatched.

As in the earlier embodiments, SCR's 272a–272d serve as the Forward Sequence Logic function described in FIG. 1 in connection with box 36. A more detailed description of their operation follows later herein, however, the gate drive signal which they receive from an associated detector transistor 262a–262d is of limited duration due to the presence of a Monitor Disengage function associated with the Monitor function of the embodiment. This Monitor Disengage function has been described generally in conjunction with block 52 of FIG. 1 and is present in the circuit as a group of NPN transistors 280a–280d. The emitters of transistors 280a–280d are coupled respectively with resistors 256a–256d and their collectors are coupled respectively with the emitter terminals of detector transistors 262a–262d. Connection with the bases of transistors 280a–280d is made respectively from the anode sides of SCR's 272a–272d through bias resistors 282a–282d.

When forward biased from power lead 226 through resistors 240b–240e and 282a–282d, transistors 280a–280d will cause an associated bridge resistor 256a–256d to be inserted in series with the terminals of corresponding flashlamp 12a–12d. This forward bias "on" status is maintained only as long as a corresponding SCR 272a–272d is in an "off" status. Inasmuch as the latter SCR "off" status is present only until a gating signal is received from an associated detector transistor 262a–262d, the period of time during which the leg of a bridge configuration containing an appropriate resistor 256a–256d draws current is minimal. As a result, the relatively higher monitoring currents resulting from relatively low resistance values at resistors 256a–256d are caused to pass through the ignitor filaments of lamps 12a–12d for advantageously short lengths of time. Accordingly, the Monitor Disengage function of the embodiment buttresses the reliability of the Monitor and Detector functions of the system.

Returning to the Forward Sequence Logic function, SCR's 272a–272d are arranged with respect to flashlamps 12a–12e so as to provide a forward successional order of flashlamp firing commencing with lamp 12a and progressing by alphabetical suffix through lamp 12e. Assuming that all of the flashlamps 12a–12e are operative or valid, the Forward Sequencing Logic function operates as follows:

At the commencement of an exposure cycle, switch $S_2$ is closed and the Lamp Switch Inhibit function causes Darlington connected transistor pairs (232a–234a)–(232e–234e) to assume an "off" status. Monitoring currents are drawn through flash-lamps 12a–12d and are detected by forwardly bias detector transistors 262a–262d. Prior to this forward biasing, Monitor Disengage transistors 280a–280e are forward biased respectively through resistors 282a–282d and 240a–240d to temporarily insert resistors 256a–256d into their corresponding bridge configurations. Inasmuch as all flashlamps 12a–12e are assumed valid, a gate drive current will be passed into the gate terminals of respective SCR's 272a–272d to render them conductive. This "on" status will cause the removal of forward bias from associated Monitor Disengage transistors 280a–280d to remove corresponding resistors 256a–256d from their respective bridge configurations. Accordingly, monitoring currents will cease to pass through corresponding flashlamps. The gating of SCR's 272a–272d also serves to shunt currents otherwise serving to forward bias the base-emitter junctions of each corresponding holding transistor 238b–238e which succeeds a given SCR in the pre-established firing order of the flashlamp array. An "off" status at any given holding transistor 238b–238e will cause the Darlington coupled transistor pair (232b, 234b)–(232e, 234e) to which it is coupled to remain in an "off" status, thereby permitting the next following detector function to gate the next following SCR 272b–272d into conduction. This forward sequencing operational pattern carries through the entire circuit. Note that the final flashlamp 12e within the predetermined firing order is not monitored.

As in the earlier embodiments, at an appropriate time in an exposure cycle, exposure control 22 will cause inhibit transistors 254a–254e to assume an "off" status. This "off" status causes transistor pair (232a, 234a) to assume an "on" status permitting the passage of igniting current through lamp 12a. The remaining lamps 12b through 12e will not be ignited at this time inasmuch as SCR's 272a–272d will remain in a conductive status by virtue of their latching characteristic. This conductive status holds "off" the next following lamp switching function as earlier described. Holding transistors 238b–238e prove to isolate the switching effects of inhibit transistors 254a–254e from SCR's 272a–272d. For instance these SCR's would be drawn "off" upon the removal of a forward bias at inhibit transistors 238b–238e during a firing sequence without the presence of the holding transistors.

The present embodiment additionally provides a Low Resistance Short Lockout earlier described in general in connection with block 58 of FIG. 1. This function has the purpose of protecting the entire circuit against the currents derived from relatively low resistance shorts in any preignited flashlamp 12a–12d. Were one of the flashlamps, for instance 12d, to short to a relatively low resistance, as opposed to becoming open circuited following the firing, it would be operative to draw an excessive amount of current simultaneously with the igniting of the flashlamp 12e. The value of the low resistance short must be above the detector level of the system, however. Lockout function 58 is present in the circuit as a group of NPN transistors 290a–290d the bases of which are coupled respectively to the cathode terminals of SCR's 272a–272d. Association of the Low Resistance Short Lockout function with the Lamp Switch Inhibit function is provided by connection between the collectors of transistor 290a–290d respectively to power lead 226 through resistors 288a–288d and through resistors 292a–292d to the bases of corresponding inhibit transistors 254a–254d. The emitters of each transistor 290a–290d are connected with power lead 224.

When forward biased, transistors 290a–290d are operative to shunt current otherwise respectively passing from resistors 288a–288d and 292a–292d to the bases of inhibit transistors 254a–254d. At such time as this shunt is removed, a corresponding inhibit transistor 254a–254d is forward biased. Transistors 290a–290d are forward biased "on" simultaneously and concurrently with the assumption of an "on" status of their associated SCR's 272a–272d. An "on" status at any transistor 290a–290d will cause a coupled, corresponding inhibit transistor 254a–254d to assume an "off" status. Conversely, an "off" status at a given transistor 290a–290d will cause the inhibit transistor 254a–254d with which it is coupled to assume an "on" status. In operation, should one of the flashlamps, for instance, lamp 12d, exhibit a low resistance short following ignition as above-discussed, SCR 272d will be "off" by virtue of no gating signal being received from detector 262d and transistor 290d will be "off." The "off" status of transistor 290d will permit inhibit transistor 254d to be forward biased into conduction through resistors 292d and 288d to, in turn, cause transistor pair (232d, 234d) to assume an "off" status isolating flashlamp 12d from the circuit. Of course, the same operational mode obtains for instances of such low resistance shorts in flashlamps 12a through 12d.

The present embodiment also includes a Following Sequence Align function similar to that described in connection with the embodiment of FIG. 3. This function is provided by diodes 294, 296 and 298. Diode 294 is connected between the collector of detector transistor 262a and the collector of detector transistor 262d. Diode 296 is connected between the collector of detector transistor 262b and the collector of detector transistor 262c. In similar fashion, diode 298 is coupled between the collector detector of transistor 262c and the collector of detector transistor 262d. These diodes cause the passage of monitoring current from any flashlamp preceding another in the firing order into the detector and associated sequencing function of the next flashlamp in the firing order. As a consequence of this arrangement, flashlamps succeding any inoperative flashlamp intermediately situated within the firing order will not be ignited simultaneously with flashlamps preceding that inoperative one. The Following Sequencing Align function will be recognized as having been described in connection with block 38 of FIG. 1.

Since certain changes may be made in the above system and apparatus without departing from the scope of the invention herein involved, it is intended that all matter contained in the above description or shown in the accompanying drawings shall be interpreted as illustrative and not in a limiting sense.

What is claimed is:

1. A flash exposure system of use with photographic apparatus incorporating shutter means actuable to uncover an exposure aperture for a select interval of time, comprising:
   means for mounting an array of flashlamps in an orientation for illuminating a photographic subject;
   terminal means for selectively interconnecting said flashlamps with power supply terminals;
   synchronization means for deriving a selectively timed flash synchronization signal in response to the initiation of the said actuation of said shutter means;
   switching means coupled with the said terminal means of each of said flashlamps and selectively responsive to said synchronization signal for causing the passage of igniting current through each of said flashlamps;
   alignment means coupled with said power supply terminals for passing electrical monitoring currents from said power supply through the said terminal means connecting said individual ones of said flashlamps to derive circuit alignment signals, said monitoring currents being limited to predetermined values below that required to ignite said flashlamps; and
   sequencing means responsive to said circuit alignment signals for selectively enabling said switching means to ignite said flashlamps in a predetermined order.

2. The exposure system of claim 1 in which said switching means comprises:
   lamp switching means coupled with said terminal means of each of said flashlamps for selectively causing the passage of igniting current through said each of said flashlamps; and
   lamp switch inhibit means for selectively enabling said lamp switching means in response to said flash synchronization signal.

3. The exposure system of claim 1 wherein said alignment means includes monitor means associated with the said terminal means connecting each said flashlamp succeeding another in said predetermined firing order for passing said electrical monitoring currents from said power supply through said select individual flashlamps and deriving monitoring output signals therefrom functionally related to the operational status of the said select flashlamps.

4. The exposure system of claim 3 in which said sequencing means comprises:
   forward sequence logic means responsive to said circuit alignment signals for selectively disabling the said switching means coupled with a said terminal means connecting a given flashlamp succeeding another in said predetermined firing order; and
   following sequence align means responsive to said monitoring output signal for disabling said switching means coupled with said terminal means connecting any flashlamp succeeding at least one other operative ignited flashlamp in said predetermined firing order.

5. The exposure system of claim 1 in which said alignment means comprises:
   monitor means associated with said terminal means connecting each said flashlamp succeeding another in said predetermined firing order for passing said electrical monitoring currents from said power supply terminals through said select individual flashlamps and deriving monitoring output signals therefrom functionally related to the operational status of the said select flashlamps; and
   detector means coupled with said monitor means and responsive to said monitoring output signal for deriving said circuit alignment signals.

6. An electronic flashlamp selection system for sequentially igniting individual flashlamps within an array of flashlamps comprising:
  terminal means for selectively interconnecting said flashlamps with power supply terminals;
  switching means coupled with the said terminal means of each of said flashlamps and selectively actuable to cause the passage of igniting currents through each of said flashlamps;
  alignment means coupled with said power supply terminals for passing electrical monitoring currents from said power supply terminals through the said terminal means connecting select individual ones of said flashlamps to derive circuit alignment signals, said monitoring currents being limited to predetermined values below that required to ignite said flashlamps; and
  sequencing means responsive to said circuit alignment signals for selectively enabling said switching means to ignite said flashlamps in a predetermined firing order.

7. The electronic flashlamp selection system of claim 6 wherein said alignment means includes monitor means associated with the said terminal means connecting each said flashlamp succeeding another in said predetermined firing order for passing said electrical monitoring currents from said power supply terminals through said select individual flashlamps and deriving monitoring output signals therefrom functionally related to the operational status of the said select flashlamps.

8. The electronic flashlamp selection system of claim 7 in which said monitor means comprises a bridge network, said network having one side incorporating said terminal means and current limiting impedance means for limiting the value of said electrical monitoring currents, and an opposite side incorporating a comparison impedance for deriving said monitoring output signal as a bridge difference signal.

9. The electronic flashlamp selection system of claim 8 wherein said alignment means further includes detector means coupled with said monitor means and responsive to said monitoring output signal for deriving said circuit alignment signals.

10. The electronic flashlamp selection system of claim 9 in which said detector means comprises transistor means coupled for selective conduction in response to said monitor means output signal for deriving said circuit alignment signals.

11. The electronic flashlamp selection system of claim 9 in which:
  said sequencing means includes forward sequence logic means actuable in response to said circuit alignment signals for selectively disabling the said switching means coupled with a said terminal means connecting a given flashlamp succeeding another in said predetermined firing order; and
  lockout means coupled between said forward sequence logic means and said switching means next preceding said forward sequence logic means in said predetermined firing order for disabling said preceding switching means when said forward sequence logic means is actuated.

12. The electronic flashlamp selection system of claim 8 including monitor disengage means coupled with said current limiting means of said bridge network and actuable to terminate the passage of said monitoring currents through said terminal means following the formation of said circuit alignment signals.

13. The electronic flashlamp selection system of claim 12 wherein said monitor disengage means comprises solid state switching means for selectively isolating said current limiting impedance means from said one side of said bridge network.

14. The electronic flashlamp selection system of claim 12 wherein said monitor disengage means is actuable in response to the activation of said sequenching means.

15. The electronic flashlamp selection system of claim 7 in which said sequencing means comprises:
  forward sequence logic means responsive to said circuit alignment signals for selectively disabling the said switching means coupled with a said terminal means connecting a given flashlamp succeeding another in said predetermined firing order; and
  following sequence align means responsive to said monitoring output signal for disabling said switching means coupled with said terminal means connecting any flashlamp succeeding at least one other operative ignited flashlamp in said predetermined firing order.

16. The electronic flashlamp selection system of claim 6 in which said alignment means comprises:
  monitor means associated with the said terminal means connecting each said flashlamp succeeding another in said predetermined firing order for passing said electrical monitoring currents from said power supply through said select individual flashlamps and deriving monitoring output signals therefrom functionally related to the operational status of the said select flashlamp; and
  detector means coupled with said monitor means and responsive to said monitoring output signal for deriving said circuit alignment signals.

17. The electronic flashlamp selection system of claim 6 wherein said sequencing means includes forward sequence logic means actuable in response to said circuit alignment signals for selectively disabling the said switching means coupled with a said terminal means connecting a given flashlamp succeeding another in said predetermined firing order.

18. The electornic flashlamp selection system of claim 17 including lockout means coupled between said forward sequence logic means and a said switching means next preceding said sequence logic means in said predetermined firing order for disabling said preceding switching means when said forward sequence logic means is actuated.

19. The electronic flashlamp selection system of claim 6 in which said alignment means comprises:
  monitor means associated with the said terminal means connecting each said flashlamp succeeding another in said predetermined firing order for passing said electrical monitoring currents from said power supply through said select individual flashlamps; and
  monitor disengage means for terminating the passage of said monitoring currents through said terminal means following the formation of said circuit alignment signals.

20. The electronic flashlamp selection system of claim 19 in which said monitor disengage means is operative to terminate the passage of said monitoring currents through said terminal means in conjunction with the said response of said sequencing means to said circuit alignment signals.

21. The electronic flashlamp selection system of claim 6 in which said alignment means includes:
  monitor means coupled with said terminal means connectable with select said flashlamps for deriving monitoring output signals functionally related to the operational status of said select flashlamps by selectively interposing a predetermined impedance between said power supply terminals and said terminal means, said impedance limiting the said valves of said monitoring currents to said predetermined values.

22. The electronic flashlamp selection system of claim 6 in which said alignment means comprises:
  monitor means coupled with said terminal means connectable with select said flashlamps for deriving monitoring output signals functionally related to the operational status of said select flashlamps by selectively interposing a predetermined impedance between said power supply terminals and said terminal means, said impedance limiting the said values of said monitoring currents to said predetermined values; and detector means coupled with said monitor means and responsive to said monitoring output signals for deriving said circuit alignment signals.

23. The electronic flashlamp selection system of claim 22 wherein said detector means comprises threshold logic means responsive to predetermined values of said monitoring output signals for forming said circuit alignment signals.

24. The electronic flashlamp selection system of claim 15 in which said detector means comprises unilaterally conductive threshold logic means having a predetermined breakover level for forming said circuit alignment signals.

25. A static electronic selection circuit for sequentially igniting individual flashlamps within an array of said flashlamps comprising:
a plurality of lamp circuits arranged in predetermined order and in parallel with each other from first to last between power supply terminals, each said lamp circuit including terminal means for providing electrical connection with a flashlamp and switching means coupled with said terminal means for conducting a flashlamp igniting current therethrough when actuated;
sequencing means for enabling said switching means to be actuated in said lamp circuit predetermined order from first to last; and
alignment means coupled with select said lamp circuits for passing test electrical current from said power supply terminals through the said flashlamps connected within said select lamp circuits to derive circuit alignment signals for aligning said sequencing means to bypass inoperative flashlamps.

26. The static electronic selection circuit of claim 25 in which said sequencing means includes forward sequence logic means responsive to said circuit alignment signals and having control stages coupled with individual ones of said lamp switching means which succeed another in said predetermined order for enabling said switching means to be actuated in said predetermined order.

27. The static electronic selection circuit of claim 26 wherein each said forward sequence logic means control stage includes gate controlled switch means coupled with said succeeding lamp circuit switching means and switchable in response to gating input from select said circuit alignment signals for disabling said succeeding lamp circuit switch means when conducting.

28. The static electronic selection circuit of claim 27 in which said gate controlled switch means includes a thyristor device having a latching characteristic.

29. The static electronic selection circuit of claim 25 in which said sequencing means comprises:
forward sequence logic means responsive to said circuit alignment signals and having control stages coupled with said switching means of said lamp circuits which succeed another in said predetermined order for enabling said switching means to be actuated in said predetermined order; and following sequence align means responsive to said circuit alignment signals and coupled between said control stages associated with adjacent said lamp circuits within said predetermined order for selectively disabling any said switching means succeeding an inoperative said flashlamp which precedes another operative unignited flashlamp within said predetermined order.

30. The static electronic selection circuit of claim 29 in which said following sequence align means comprises unilaterally conductive means for conducting said circuit alignment signals from individual ones of said control stages to all control stages succeeding said individual ones in said predetermined order.

31. The static electronic selection circuit of claim 26 in which:
each said forward sequence logic means control stage includes gate controlled switch means coupled with said succeeding lamp circuit switching means and switchable in response to gating input from select said circuit alignment signals for disabling said succeeding lamp circuit switching means when conducting; and
unilaterally conductive means coupled between individual ones of said gate controlled switch means for any switching controlled switch means to disable any said switching means succeeding an inoperative said flashlamp which precedes another operative, unignited flashlamp within said predetermined order.

32. The static electronic selection circuit of claim 29 in which said alignment means comprises:
monitor means coupled with each said lamp circuit which precedes another in said predetermined order for passing a test electrical current through individual ones of said flashlamps and deriving monitoring output signals therefrom functionally related to the operational status of the said flashlamp through which said current is passed; and
detector means responsive to said monitoring output signals for regulating respective ones of said control stages in a manner aligning said sequencing means to bypass inoperative flashlamps.

References Cited
UNITED STATES PATENTS

| | | | |
|---|---|---|---|
| 3,532,931 | 10/1970 | Coté et al. | 315—240 |
| 3,518,487 | 6/1970 | Tanaka et al. | 240—1.3 X |
| 3,500,732 | 3/1970 | Nijland et al. | 240—1.3 X |
| 2,899,880 | 8/1959 | Graef | 95—11.5 |
| 3,438,315 | 4/1969 | Goshima et al. | 240—1.3 X |

SAMUEL S. MATTHEWS, Primary Examiner

R. E. ADAMS, Jr., Assistant Examiner

U.S. Cl. X.R.

95—11 L; 240—1.3